United States Patent [19]

Rückl

[11] Patent Number: 5,386,097
[45] Date of Patent: Jan. 31, 1995

[54] DEVICE FOR MACHINING THIN-WALLED HOLLOW CYLINDERS USING A LASER BEAM

[75] Inventor: Siegfried Rückl, Langkampfen, Austria

[73] Assignee: Schablonentechnik, Kufstein, Gesellschaft, Kufstein, Austria

[21] Appl. No.: 38,294

[22] Filed: Mar. 25, 1993

[30] Foreign Application Priority Data

Mar. 27, 1992 [EP] European Pat. Off. ............ 92105351

[51] Int. Cl.⁶ ............................................. B23K 26/00
[52] U.S. Cl. ............................ 219/121.68; 219/121.82
[58] Field of Search ...................... 219/121.68, 121.69, 219/121.6, 121.82

[56] References Cited

U.S. PATENT DOCUMENTS

5,198,636  3/1993  Suchan ........................... 219/121.68

Primary Examiner—C. L. Albritton
Attorney, Agent, or Firm—Workman Nydegger Jensen

[57] ABSTRACT

A device for machining the surface of a thin-walled hollow cylinder using a laser beam. The laser beam is directed essentially radially onto the surface of the hollow cylinder and can be moved in a longitudinal direction along the cylinder's length as the cylinder is rotated, producing a rotary screen. A support bearing can move along with the laser beam for supporting the hollow cylinder around its circumference. The support bearing is stationary in the circumferential direction of the hollow cylinder, that is to say it cannot rotate around the latter, while in addition the laser beam passes through an opening extending radially in the support bearing. As a result, the vibration of the hollow cylinder can be damped in the immediate vicinity of the point of impingement of the laser beam on the hollow cylinder so that very precise master patterns can be generated.

26 Claims, 7 Drawing Sheets

DEVICE FOR MACHINING THIN-WALLED HOLLOW CYLINDERS USING A LASER BEAM

BACKGROUND

1. Field of the Invention

The invention relates to a device for machining the surface of a thin-walled hollow cylinder with the aid of a laser beam, particularly for producing a rotary screen which can be used, for example, for printing materials.

2. The Prior State of the Art

The production of a rotary screen is usually based on a metallic hollow cylinder which is thinly coated on its external surface with an organic lacquer and has a very thin wall thickness. The metallic hollow cylinder has a multiplicity of small through-openings which are located very closely adjacent to one another and which are tightly closed by the organic lacquer. To generate a master pattern, the metallic hollow cylinder is clamped with both ends in a device which is similar to a lathe and which has accurate concentricity. A laser beam moved closely parallel to the longitudinal axis of the hollow cylinder is deflected by a deflection mirror, which can be moved axially parallel, in such a manner that it then extends perpendicularly to the surface of the hollow cylinder. This laser beam is focused with the aid of a lens arrangement in such a manner that a focal point of a very small diameter comes to lie accurately on the cylinder surface. If the laser beam is pulsed, the organic lacquer can be removed by vaporization from the surface of the hollow cylinder in accordance with a predetermined master pattern, the laser beam being guided in the axial direction of the hollow cylinder, on the one hand, and the hollow cylinder itself being rotated. In the areas where the lacquer has been removed, the through-openings in the hollow cylinder are then exposed so that viscous means, for example a printing paste, can be pressed through them at a later stage.

When the electronic master pattern is transferred to the surface of the hollow cylinder, its thin cylinder wall must run with sufficiently accurate concentricity because otherwise each running error also causes a faulty position of the engraving, that is to say of the master pattern to be generated.

To achieve accurate concentricity, the hollow cylinder has in the past been pushed onto an accurately concentric mandrel. However, this has the disadvantage that a handling space of the order of magnitude of the hollow cylinder or of the order of magnitude of the screen length must remain free in the axial direction of the device. In addition, it is required to exchange the concentric mandrel for a mandrel with another diameter when the diameter of the rotary screens is changed, which represents a considerable problem in the refitting work because of the size and the weight of these parts. On the other hand, it is already known to push a ring onto the hollow cylinder to be machined or to be engraved, the inside diameter of which ring is larger by only a few tenths of a millimeter than the outside diameter of the hollow cylinder. Friction causes the ring to be entrained by the hollow cylinder and to revolve with it. The ring is carried along with the lens system which focuses the laser beam so that it is initially located at the left-hand end of the hollow cylinder and then slowly moves together with the lens system to the other or right-hand end of the hollow cylinder. The disadvantage here is that the laser beam moves laterally past the ring. Due to the very thin wall of the hollow cylinder, it is therefore no longer sufficiently damped in the area of the laser beam so that vibrations in this area, particularly diaphragm oscillations, can still lead to considerable errors during the engraving of the hollow cylinder with the aid of the laser beam.

BRIEF SUMMARY AND PRINCIPAL OBJECTS OF THE INVENTION

The present invention seeks to resolve the above and other problems which have been experienced in the art. It is thus a principal object of the invention to provide a device for machining thin-walled hollow cylinders using a laser beam, and wherein vibration damping can be carried out as closely as possible to the laser engraving area.

Additional objects and advantages of the invention will be set forth in the description which follows, or may be learned by the practice of the invention. The objects and advantages of the invention may be realized and obtained by means of the instruments and combinations particularly pointed out in the appended claims.

To achieve the foregoing object, and in accordance with the invention as embodied and broadly described herein, the present invention is a device for machining the surface of a thin-walled hollow cylinder with the aid of a laser beam which impinges at least approximately radially on the hollow cylinder and can be moved in its longitudinal direction, particularly for producing a rotary screen, by means of a support bearing, which can be moved along with the laser beam, for supporting the hollow cylinder along its circumferential direction. The support bearing is arranged so as to be stationary in the circumferential direction of the hollow cylinder and has an opening for the radial passage of the laser beam. The result of the arrangement, according to the invention, is that the laser beam impinges on the surface of the hollow cylinder directly in the area of the support bearing, with the greatest vibration damping occurring in this area. In other words, the laser beam impinges on the hollow cylinder in a vibration node area so that correct engraving of the hollow cylinder with the aid of the laser beam is ensured. The fact that the support bearing is arranged to be stationary in the circumferential direction of the hollow cylinder means that the support bearing does not rotate around the hollow cylinder axis or move around the hollow cylinder. Instead, the support bearing is only moved in the longitudinal or axial direction of the hollow cylinder. Since the position of the hollow cylinder within the support bearing stabilizes relatively quickly, the surface of the hollow cylinder suffers virtually no damage during its rotation.

The opening in the support bearing can be generated in different ways. It can be, for example, a radially extending hole in an annularly constructed support bearing, the laser beam passing through this radial hole. However, the opening can also have other suitable forms, the only essential factor being that it allows the laser beam to impinge on the surface of the hollow cylinder in its radial direction.

In accordance with the broadly stated and described principles of the invention, the support bearing can either totally or partially surround the hollow cylinder annularly or part-annularly. If the support bearing is constructed as a ring, it preferably has a radial through-opening for the laser beam which is centrally located in the width or axial direction of the ring. As a result, the laser beam impinges on the surface of the hollow cylinder in an area which is damped in an identical manner on both sides of the laser beam. In the case of a support bearing that is constructed so as to partially annularly surround the hollow cylinder, the opening can come to lie, for example, between the end faces of two part-rings located opposite one another in the circumferential direction. Naturally, one of the part-rings can also contain a corresponding opening or through-opening for the laser beam.

The partially surrounding annular construction of the support bearing has the advantage that it can be constructed in the form of two bearing bows which can be pivoted with respect to one another. If one of the bearing bows is pivoted out of its operating position, a hollow cylinder can be easily inserted into the support bearing or removed from it again. This considerably simplifies the production of the rotary screen.

In accordance with another advantageous aspect of the invention, the support bearing is at least partially constructed in the manner of a hollow frame and with a side open towards the hollow cylinder and connected to a suction device.

The support bearing, constructed annularly or part-annularly, can then suck the hollow cylinder against itself in certain areas as a result of which vibrations of its surface can be damped even further. It has been found that no serious damage of the surface of the hollow cylinder or respectively of the lacquer layer located on it needs to be feared in either case.

The cross-sectional shape of the support bearing constructed in the manner of a hollow frame, seen in a plane perpendicular to the circumferential direction, can be of any design. The only important factor is that the support bearing is hollow on the inside and open towards the hollow cylinder in order to suck the latter against itself when a negative pressure is generated in its interior.

Arms of the support bearing are preferably moved close to the surface of the hollow cylinder to form a narrow gap between the end faces of the support bearing and the hollow cylinder. The distance between the end faces of the arms and the surface of the hollow cylinder is preferably only a few tenths of a millimeter in order to achieve a large suction effect.

In a further aspect of the invention, the support bearing can exhibit a plurality of bodies of rotation on which the surface of the hollow cylinder rolls off, the laser beam extending in the area between the bodies of rotation in the direction of the hollow cylinder. The bodies of rotation prevent the hollow cylinder from hitting against stationary parts, which is particularly advantageous when relatively soft and thus extremely sensitive lacquer layers are located on the surface of the hollow cylinder or absolutely no further disturbance of the lacquer layer on the surface of the hollow cylinder can be tolerated due to a very small raster.

On the other hand, all bodies of rotation arranged in the circumferential direction of the hollow cylinder permanently rest against the latter which leads to an even better vibration damping.

A negative pressure can also be additionally generated in the case of the bodies of rotation in order to then pull the hollow cylinder against the bodies of rotation in order to achieve further improvement in the smoothness of running of the hollow cylinder.

In accordance with another advantageous aspect of the invention, the bodies of rotation are aligned in such a manner that they transfer a force component both in its tangential direction and a force component in its axial direction into the hollow cylinder.

It has been found that the vibration characteristic of the hollow cylinder can also be advantageously influenced by the force component transferred in the axial direction, namely in the direction of even smaller vibration amplitudes so that even more precise master patterns can be produced by this measure.

The bodies of rotation can be, for example, conical rollers or cylindrical rollers. To be able to transfer force components in the axial direction of the hollow cylinder in this case, the axes of rotation of the bodies of rotation are inclined with respect to a plane in which the cylinder axis of the hollow cylinder extends.

According to another advantageous aspect of the invention, the bodies of rotation have a concave contour in order to ensure even greater implacement against the hollow cylinder and thus an introduction of greater damping forces when the axes of rotation of the bodies of rotation are inclined with respect to the above-mentioned plane. In other words, the bodies of rotation in each case encircle a part of the circumference of the hollow cylinder, for which purpose the extent of their contour is matched to the circumferential extent of the hollow cylinder.

To achieve even greater smoothness of running of the hollow cylinder in the support bearing, the bodies of rotation can also be constructed as permanent magnets in order to conduct a magnetic flux through the hollow cylinder and thus to pull it against the rotational rollers. Instead of the rotational rollers, however, the bearing bows can also be provided with permanent magnets. The magnetic flux can then be conducted, for example, via pole shoes which are connected to the bearing bows through the hollow cylinder to pull the latter against the support rollers which can be magnetic or nonmagnetic. This, too, achieves even greater smoothness of running of the hollow cylinder in the support bearing.

The support bearing preferably extends over the entire circumference of the hollow cylinder with the exception of the area for the laser beam. The result is that bearing forces act as uniformly as possible, distributed over the circumference of the hollow cylinder, and thus a particularly smooth bearing is achieved.

Naturally, it is also possible to provide the bodies of rotation with an elastic covering on their circumferential area in order to prevent them from damaging the surface of the hollow cylinder.

As already mentioned, the support bearing exposes an area of the surface of the hollow cylinder for which purpose it is provided with an opening. This opening can be formed, for example, by a space between two bodies of rotation which are adjacent in the circumferential direction. The laser beam then passes through this opening, specifically in the radial direction of the hollow cylinder.

Both the deflection and focusing optics for the laser beam and the support bearing can be mounted on a common carriage which can be moved in the axial direction of the hollow cylinder. According to a further advantageous aspect of the invention, it is then possible to decouple the deflection and focusing optics from the carriage or the support bearing with respect to vibrations, specifically by means of a mechanical damping element, for example, by an elastic base to prevent vibrations of the support bearing from being transferred to the deflection and focusing optics.

The deflection and focusing optics can rest, for example, on a transverse carriage which, in turn, is mounted on the aforementioned common carriage, for example via the elastic base.

The device according to the invention has an operating side from which the hollow cylinder is inserted into the device. If the opening in the support bearing points towards the operating side, that is to say if an upper bearing bow can be pivoted rearwardly and away from the operating side, the hollow cylinder can be inserted into the support bearing with particular ease and without reversing the direction of movement. In this case, however, the carriage for the deflection mirror and the focusing optics are also located on the operating side which again makes it difficult to equip the device with the hollow cylinder and to remove the hollow cylinder. It must be lifted over the deflection mirror and the focusing optics which entails the risk of damaging these components.

According to the invention, the support bearing can also be constructed in such a manner that it exhibits an opening for the laser beam which points away from the operating side. In that case, an upper bearing bow of the support bearing can be folded away rearwardly from the operating side in order to be able to insert the hollow cylinder in the support bearing. The carriage with the deflection mirror and the focusing optics are then located at the rear of the device, that is to say no longer on the operating side so that they no longer form an obstacle to equipping the device with the hollow cylinder. The power laser for generating the laser beam which, for example, can be pulsed, is always located at the rear of the device.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention in its presently understood best mode for making and using the same will be described with additional specificity and detail through the use of the accompanying drawings in which.

In the text which follows, the invention will be described in detail with reference to the drawings, in which like parts are designated with like numerals throughout.

DETAILED DESCRIPTION OF THE PRESENTLY PREFERRED EMBODIMENTS

Figure 1:
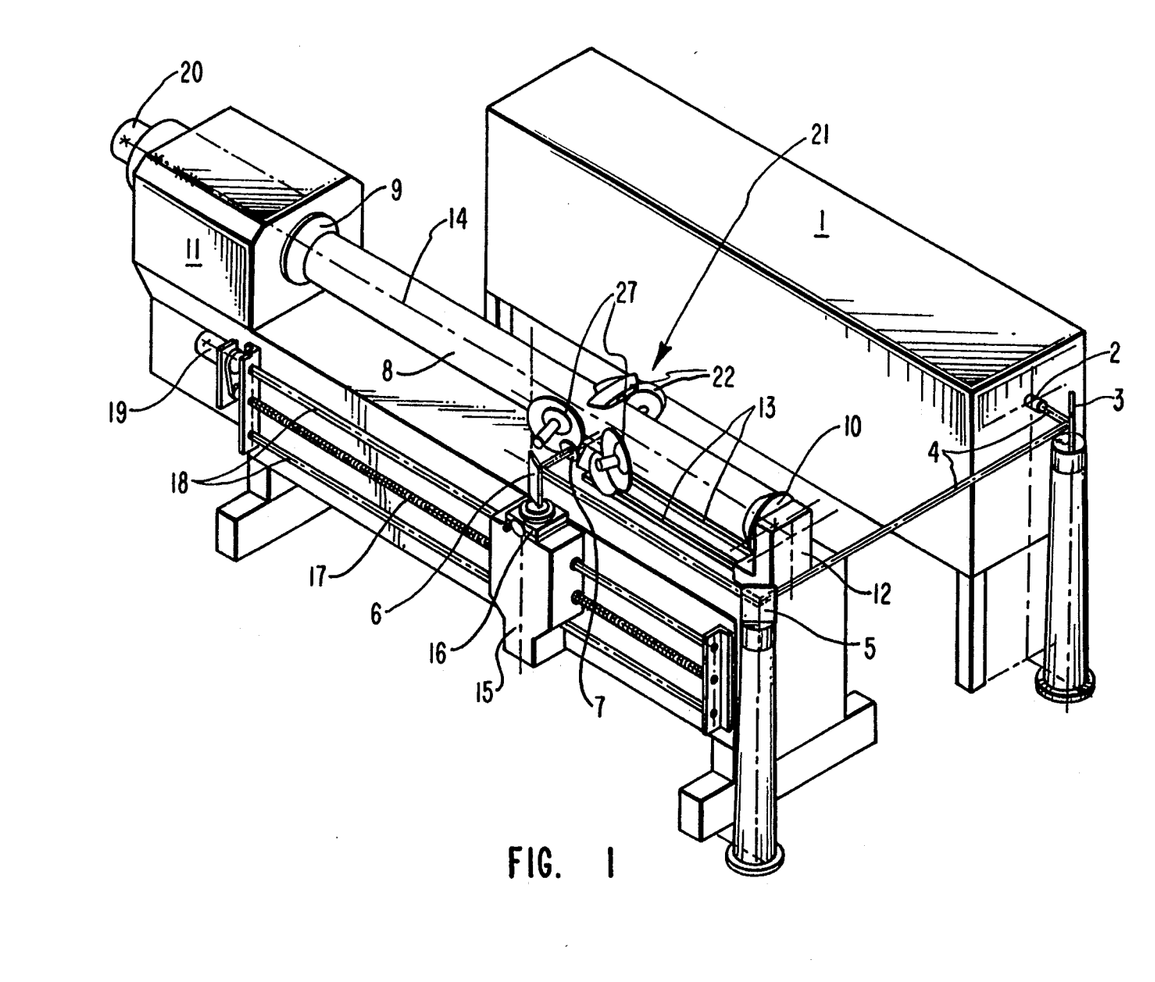
FIG. 1 schematically illustrates a perspective overall view of the device with a laser beam extending on the operating side of the device.
Figure 2:
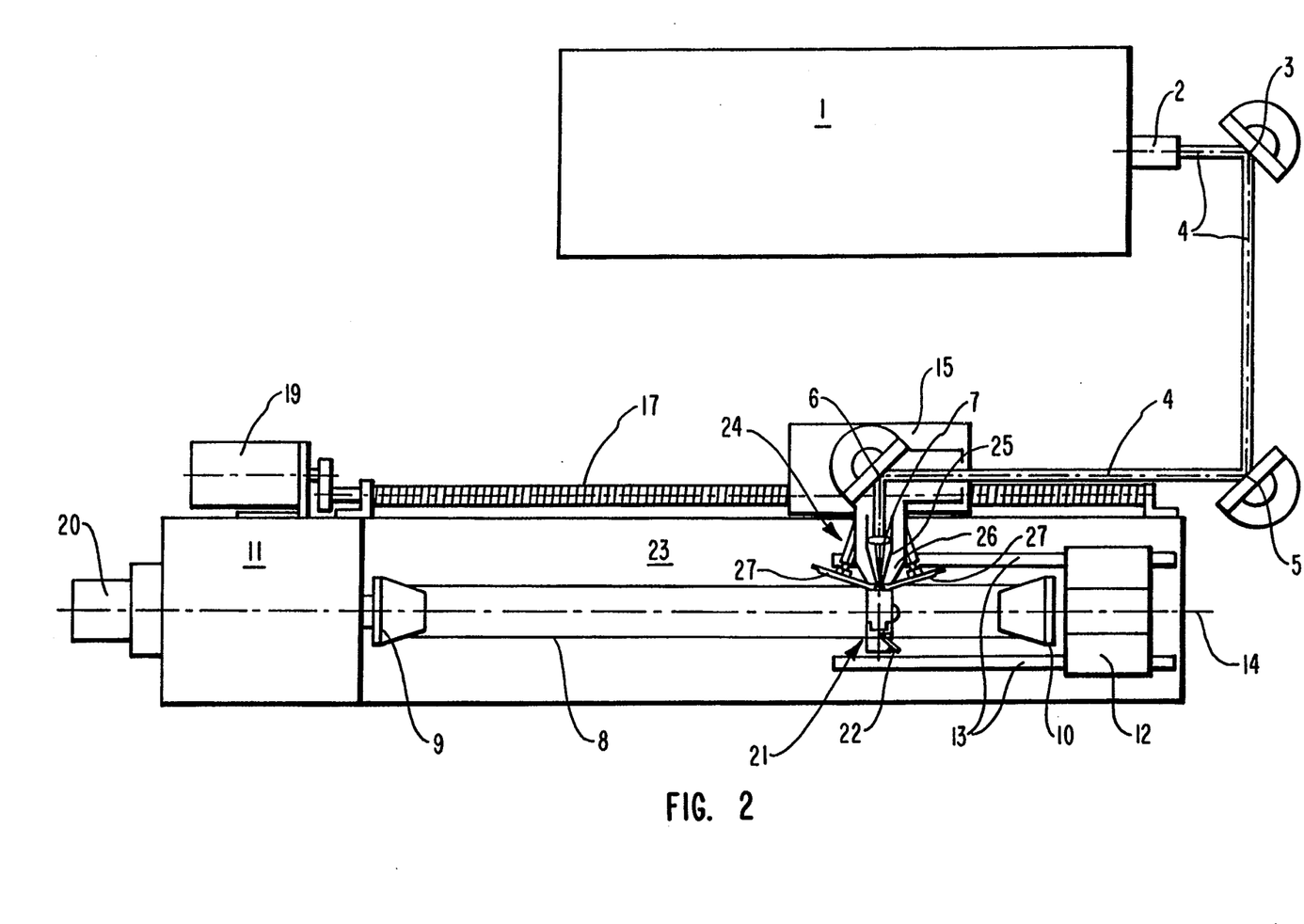
FIG. 2 shows a perspective overall view of the device with a laser beam extending at the rear of the device.

Referring first to FIGS. 1 and 2, those drawings show a device according to the invention comprising a power laser 1 which outputs via an exit opening 2, and a laser beam 4 impinging on a first deflection mirror 3. The laser beam 4 is deflected by 90 degrees by the first deflection mirror 3 and impinges on a second deflection mirror 5 where it is again deflected by 90 degrees so that it now extends in a direction opposite to its original direction. The laser beam 4 is again deflected by 90 degrees via a third deflection mirror 6 in the direction of the power laser 1. During this process, the laser beam 4 extending after the third deflection mirror 6 is focused with the aid of focusing optics, by means of a lens 7 in the present case, in such a manner that its focal point comes to lie on the outer surface of a hollow cylinder 8. The surface of cylinder 8 can be coated, for example, with an organic lacquer.

The hollow cylinder 8 consists of a very thin and uniformly perforated metal grid and is held between two rotatably supported truncated cones 9 and 10. The truncated cone 9 is put into rotation in a headstock 11 by a drive, not shown. The truncated cone 10 is also rotatably supported in a tailstock 12. The tailstock 12 can be pressed against the hollow cylinder 8 on guide tracks 13 in the direction of a hollow-cylinder axis 14, where it then presses the hollow cylinder 8 against the truncated cone 9.

Due to the friction produced in this manner, the hollow cylinder 8 and the truncated cone 10 are entrained by the rotary movement of the truncated cone 9. Owing to the extremely low frictional resistance to be overcome by the truncated cone 10 supported in ball bearings in the tailstock 12 and also due to the highly constant rotary drive speed of the truncated cone 9, very low axial clamping forces between the hollow cylinder 8 and the truncated cones 9 and 10 are sufficient for driving the hollow cylinder 8 without slip and thus at the rotary speed of the truncated cone 9.

The third deflection mirror 6 and the lens 7 are mounted on a carriage 15 which can be moved in the direction of the hollow-cylinder axis 14. More precisely, the carriage 15 carries a transverse carriage 16 on which the third deflection mirror 6 and the lens 7 are arranged and by means of which an accurate radial adjustment of the focal point generated by the lens 7 on the surface of the hollow cylinder 8 is possible.

If the carriage 15 is moved along guide rods 18 in the direction of the hollow-cylinder axis 14 with the aid of a spindle 17 and if at the same time the hollow cylinder 8 is rotated, the focal point of the lens 7 or of the laser beam 4 focuses at the focal point describes a helical line on the surface of the hollow cylinder 8. The spindle 17 is driven by a stepping motor 19. The power laser 1 is pulsed. To control the laser pulses emitted by the power laser 1 and for stepping the stepping motor 19 it is necessary to know the accurate rotation position of the hollow cylinder 8 at any time. For this reason, a rotational position decoder 20, which outputs several thousand pulses during one revolution of the hollow cylinder 8, is connected to the shaft of the truncated cone 9.

When the very thin-walled and perforated hollow cylinder 8, the wall thickness of which can be less than one millimeter and which can have a diameter of, for example, ten to thirty centimeters, is driven, vibration phenomena occur which are attributable both to the natural bending frequencies or to the critical revolutions of the hollow cylinder 8 and to diaphragm oscillations. These vibration phenomena are greater the closer the rotational speed of the hollow cylinder 8 is in the vicinity of a natural frequency. Since the power laser 1 is operated at a high operating frequency, the rotational speed for the hollow cylinder 8 must be selected to be relatively high. Due to the length of the hollow cylinder 8, which can be several meters, the first naturally critical rotational speed is, however, very low so that the hollow cylinder 8 runs very roughly if no additional measures are taken.

To raise the natural bending frequency to a higher value and to improve the stiffness of the cylinder surface, a support bearing generally designated at 21 is used in the present invention, which bearing 21 is applied to the hollow cylinder 8 at several positions located in its circumferential direction. The support bearing 21 is firmly connected to the carriage 15 and is moved jointly with the laser beam 4, focused by the lens 7, in the longitudinal direction of the hollow cylinder 8 when the carriage 15 is guided along the guide rods 18, that is to say when it is moving parallel to the hollow-cylinder axis 14.

Figure 3:
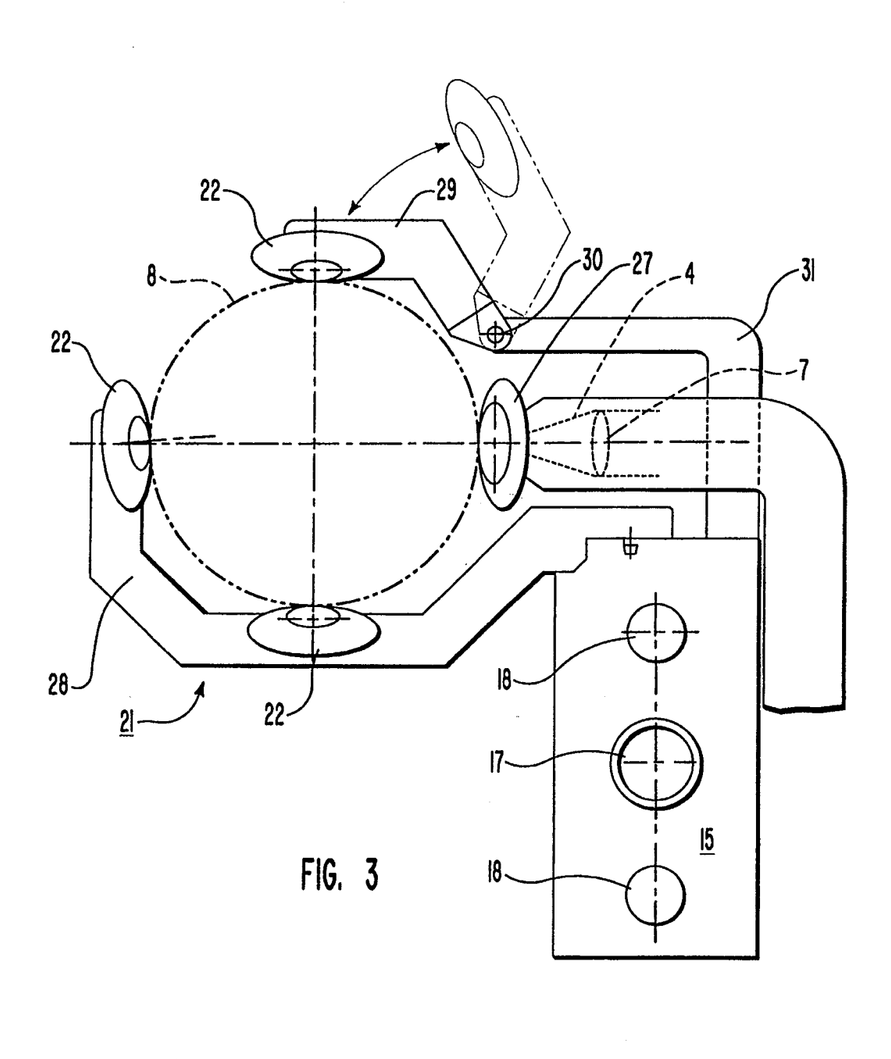
FIG. 3 shows front view of a support bearing in accordance with a first illustrative embodiment.
Figure 4:
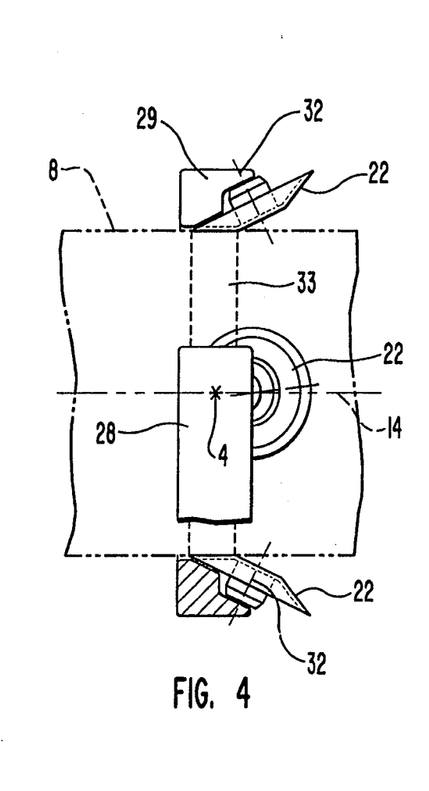
FIG. 4 shows a side view of the support bearing according to FIG. 3.
Figure 10:
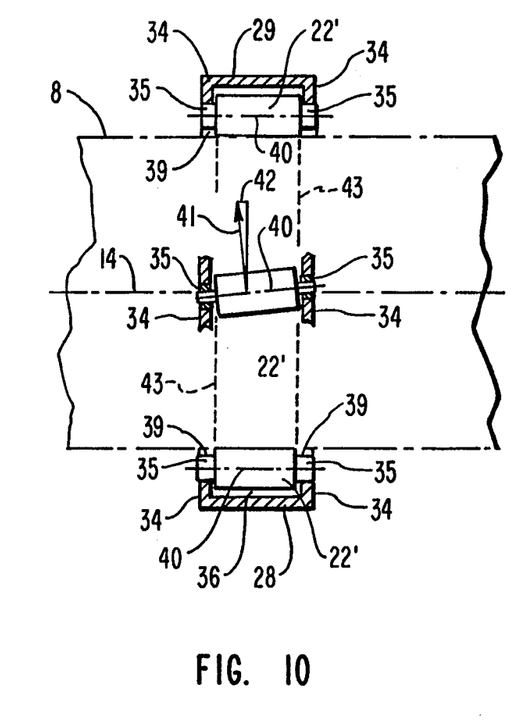
FIG. 10 shows a side view of the support bearing according to FIG. 9.

The support bearing 21 can contain, for example, a plurality of bodies of rotation 22 (See FIGS. 3 and 4) which are arranged at a distance from one another in a level area 33, 43, located perpendicularly to the hollow-cylinder axis 14, as shown in FIGS. 4 and 10, in the circumferential direction of the hollow cylinder 8. In exactly this level area 33, 43, the focused laser beam 4 also extends radially towards the hollow cylinder 8, the laser beam being guided to the hollow cylinder 8 from the operating side of the device, as shown for example in FIG. 1. The operating side is shown here as the side at which the carriage 15 is located, whereas the power laser 1 previously mentioned is located at the rear of the device. The focused laser beam 4 extending between the third deflection mirror 6 and the hollow cylinder 8 extends virtually radially through the support bearing 21 in a space between two bodies of rotation 22. This space forms the so-called opening in the support bearing 21.

FIG. 2 shows a corresponding device in which, however, the carriage 15 for axial guidance of the laser beam 4 is located at the rear. The focused laser beam here impinges on the hollow cylinder 8 from the rear of the device after having passed through the lens 7. The opening in the support bearing 21 thus points away from the operating side in the device shown in FIG. 2. This has the advantage that the device can be more easily equipped with a hollow cylinder 8 since the carriage 15 and optics 6, 7 mounted on it are no longer in the way as an obstacle on the operating side.

The headstock 11 and the tailstock 12 are mounted on a machine bed 23 on which the spindle 17 and the guide rods 18 are also laterally mounted. As shown in FIG. 2, the lens 7 provided for focusing the laser beam 4 is also arranged in an engraving head generally designated at 24. The pressure inside an inner nozzle 25 tapering towards the hollow cylinder 8, in which the lens is permanently positioned, is slightly higher than the environmental pressure, the higher pressure being maintained by introducing nitrogen. The tapering of the inner nozzle 25 corresponds to the variation in the focused laser beam behind the lens 7. The nitrogen emerges from the inner nozzle 25 at its narrowest point, that is to say in the area of the nozzle tip, and thus prevents dirt particles from entering the inner nozzle 25 so that contamination of the lens 7 occurring in the course of time is avoided.

The inner nozzle 25 is concentrically surrounded by a larger suction nozzle 26, the suction nozzle 26 sucking off the vaporizing and immediately recondensing lacquer, on the one hand, and, on the other hand, sucking against the wall of the hollow cylinder 8 as a result of which the wall is forced to continuously rest against a circumferential edge of conical support discs 27 which are laterally positioned on the suction nozzle 26. The unit consisting of the inner nozzle 25, the suction nozzle 26 and the support disc 27 is moved in the axial direction 14 of the hollow cylinder 8, the circumferential wall of the hollow cylinder 8 being permanently supported by the support disc 27 in the side areas of the support bearing 21, as a result of which an even better vibration damping is achieved. The support discs 27 are supported rotatably on the engraving head 24, their axes of rotation being outwardly inclined relative to the optical axis of the lens 7 in the direction of the hollow cylinder 8. They are designed as truncated cones, the circumferential area of the hollow cylinder 8 being projected onto the conical surface of the support discs 27.

The opening existing in the support bearing 21 is selected to be large enough for there to be sufficient space for the support discs 27, which are applied to the surface of the hollow cylinder 8 which is immediately adjacent to the focal point of the laser beam 4 in the axial direction of the hollow cylinder 8.

FIG. 3 shows a front view of a support bearing according to the invention, seen in the axial direction of the hollow cylinder 8, whilst FIG. 4 is a side view of this support bearing seen from the left in FIG. 3.

The support bearing 21 according to FIGS. 3 and 4 exhibits as bodies of rotation conical rollers 22, namely an upper, a lower and a lateral roller 22 which each point towards the front of the device. The area in which the surface of the lateral conical roller 22 and the surface of the hollow cylinder 8 are in contact is radially opposite to the point of impingement of the laser beam 4 which has been focused by the lens 7. The support discs 27 are located to the side of this point of impingement of the focused laser beam 4 in the axial direction of the hollow cylinder 8.

The conical roller 22, which is at the bottom and on the left in FIG. 3, is rotatably supported on a lower bearing bow 28 which, in turn, is permanently connected to the carriage 15. A bearing bow 29, which is attached via a hinge 30 to an arm 31 which is also permanently connected to the carriage 15, is used to rotatably support the upper conical roller 22. The upper bearing bow 29 can be folded away in the direction of the rear of the device as shown by the dashed lines, in order to insert the hollow cylinder 8 into the support bearing 21 or to be able to remove it from this bearing, by this means. In other words, the conical roller 22 shown on the left in FIG. 3 is located on the operating side of the device whilst the carriage 15 is located at the rear of the device from which the hollow cylinder 8 is also irradiated.

If the carriage 15 is transported along the guide rods 18 via the spindle 17, the lower bearing bow 28 and the upper bearing bow 29 move along with the carriage 15 and in the axial direction 14 of the hollow cylinder 8. At the same time, the support discs 27 are also moved along since they are mounted on the engraving head 24 which, in turn, is arranged on the carriage 15. According to FIG. 4, the axes of rotation 32 of the conical rollers 22 are located in planes in which the central axis 14 of the hollow cylinder 8 is also located. The surface of the conical rollers 22 is in the area of contact with the hollow cylinder 8 in parallel with its surface, the sections of the surfaces of the conical rollers in contact with the hollow cylinder 8 defining a strip or region 33 which extends along the circumference of the hollow cylinder 8. It is precisely in the strip or region 33 that the laser beam 4 impinges on the hollow cylinder 8, namely coming from the rear in FIG. 4, that is to say from the rear of the paper. The engraving of the hollow cylinder 8 with the aid of the laser beam 4 thus always occurs within the strip or region 33 which is most highly vibration-damped so that a correct master pattern can be generated.

Figure 5:
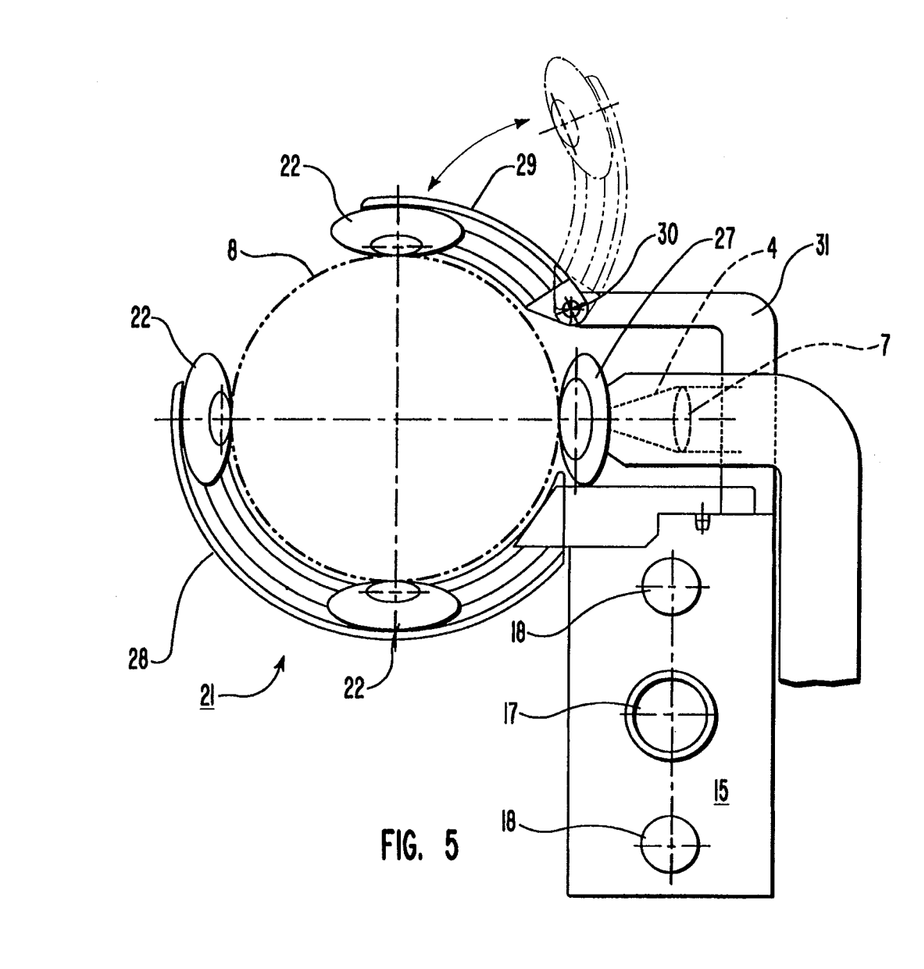
FIG. 5 shows front view of a support bearing in accordance with a second illustrative embodiment.
Figure 6:
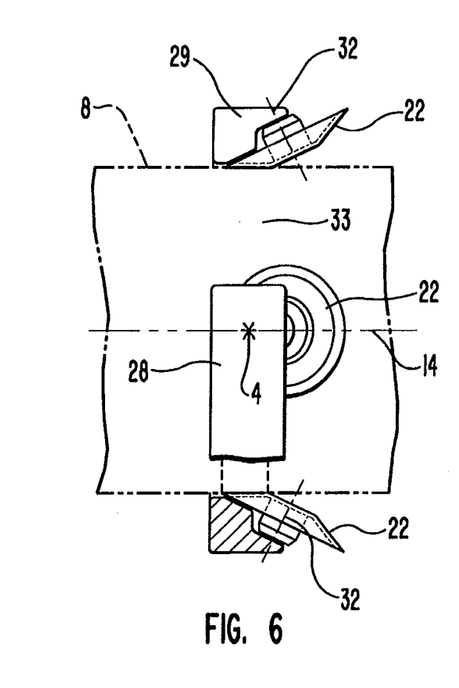
FIG. 6 shows a side view of the support bearing according to FIG. 5.

FIGS. 5 and 6 show a similar support bearing 21 as FIGS. 3 and 4, the difference being that the lower bearing bow 28 and the upper bearing bow 29 are no longer constructed to be polygonal but part-circular. Otherwise, identical parts as in FIGS. 3 and 4 are provided with the same reference numerals and will not be described again.

Figure 7:
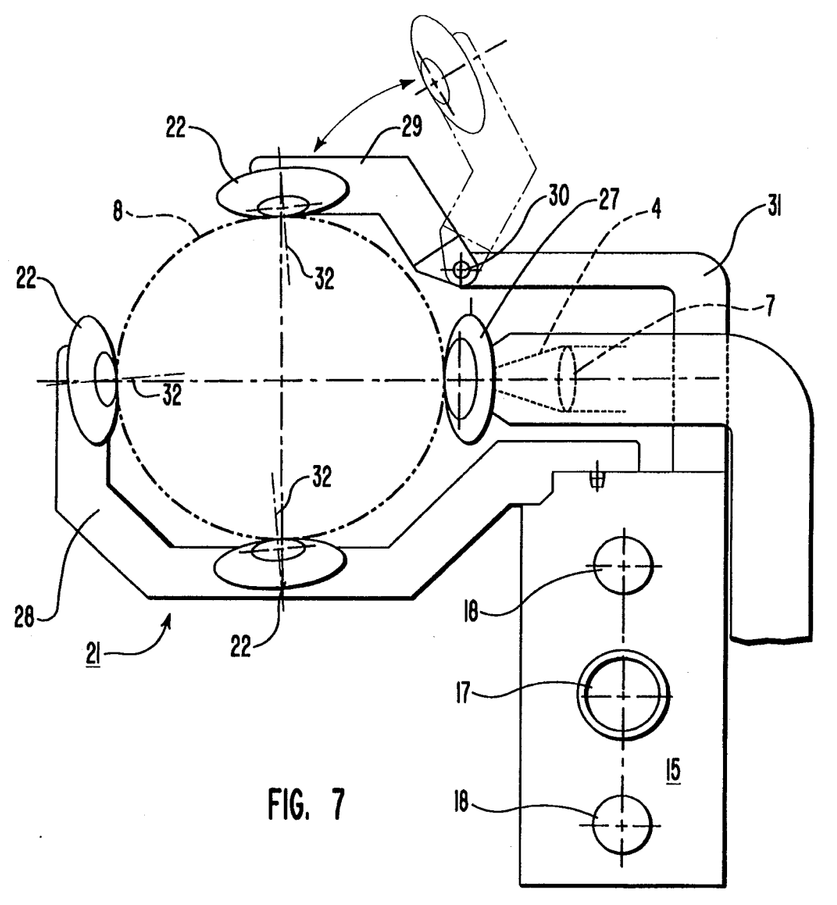
FIG. 7 shows a front view of a support bearing in accordance with a third illustrative embodiment.
Figure 8:
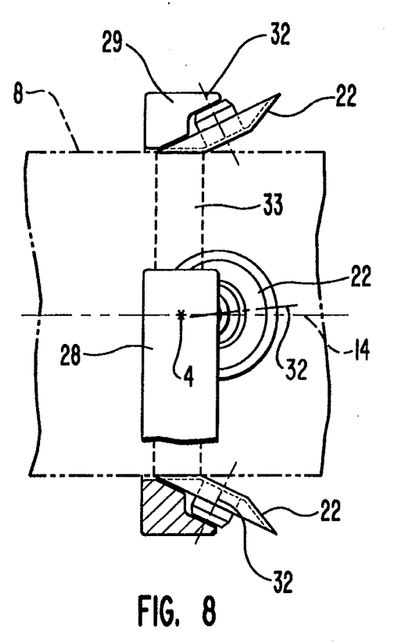
FIG. 8 shows a side view of the support bearing according to FIG. 7.

A further embodiment of the invention is shown in FIGS. 7 and 8 which show a support bearing 21 which is essentially constructed as that according to FIGS. 3 and 4. Identical parts as in FIGS. 3 and 4 are therefore provided with the same reference numerals and will not be described again. The difference between the two support bearings consists in that, according to FIGS. 7 and 8, the axes of rotation 32 of the conical rollers 22 are inclined in such a manner that they extend transversely to a plane in which the central axis 14 of the hollow cylinder 8 is located. According to FIGS. 3 and 4, the axes of rotation 32 are also inclined with respect to the central axis 14 but they are located in the same plane in which the central axis 14 is also located. This is different in FIGS. 7 and 8. The reason is that forces acting in the axial direction 14 of the hollow cylinder 8 are transferred to the cylinder's surface with the aid of the conical rollers 22, and the forces thus transferred to the surface of cylinder 8 produce an even more stable and smooth running of the hollow cylinder 8 in the support bearing 21. Apart from these forces acting in the axial direction, which are generated due to the friction between the hollow cylinder 8 and the conical rollers 22, the forces acting in the tangential direction naturally are still the same.

To provide an even better friction lock between the conical rollers 22 and the hollow cylinder 8 in this case, the contour of the surface of the conical rollers 22 can also be constructed to be concave so that the conical rollers 22 partially place themselves around the hollow cylinder 8 with their surface or rest against the cylinder.

Figure 9:
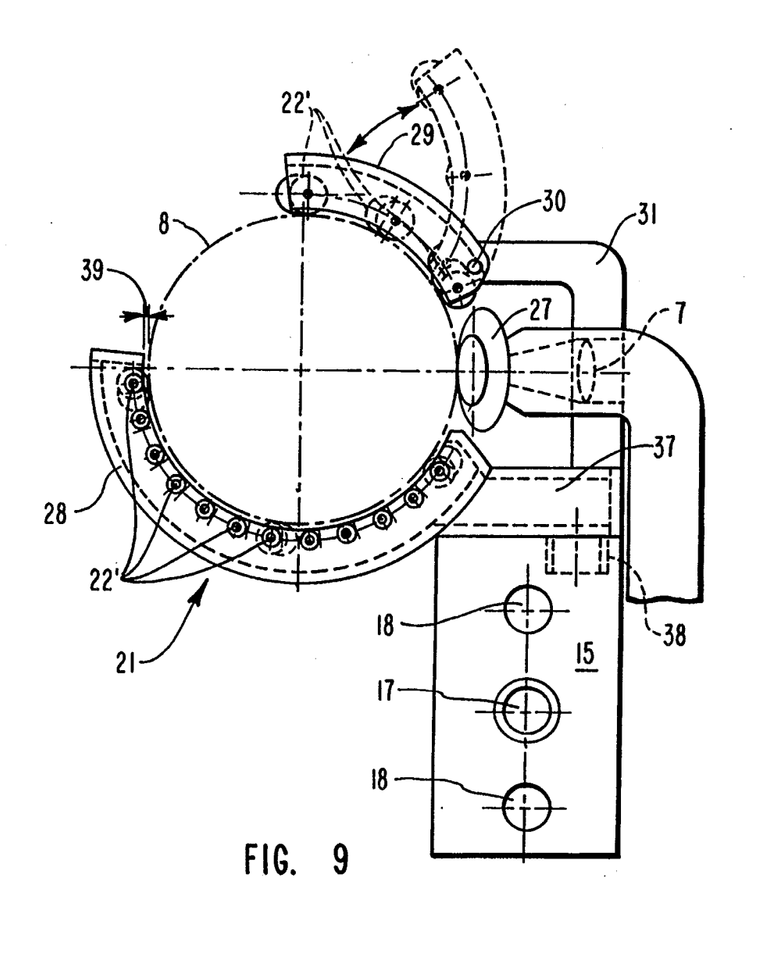
FIG. 9 shows front view of a support bearing according to a fourth illustrative embodiment.

In the text which follows, a fourth illustrative embodiment of the invention will be described in greater detail with reference to FIG. 9 and 10.

The support bearing 21 according to FIGS. 9 and 10 again has two part-circular bearing bows 28 and 29 which are permanently mounted on the carriage 15 and are moved along with the latter in the axial direction 14 of the hollow cylinder 8. The upper bearing bow 29 can be folded towards the rear from the front of the device around a hinge 30, namely in the position shown with the aid of dashed lines as already described in conjunction with the previously mentioned illustrative embodiments.

The lower bearing bow 28 and the upper bearing bow 29 are constructed as hollow frames which have arms 34 (see FIG. 10) located at a distance from one another, which are brought close to the surface of the hollow cylinder 8. In the upper bearing bow 29, three cylindrical rollers 22' are arranged as bodies of rotation, the cylinder axes of which are supported in bearings 35 (see FIG. 10) which are secured between the arms 34. The upper bearing bow 29 can extend up to the highest point of the hollow cylinder 8 starting from the supporting discs 27. The cylindrical rollers 22' slightly protrude past the arms 34 so that the hollow cylinder 8 can roll on the cylindrical rollers 22'.

The lower bearing bow 28 accommodates a relatively large number of cylindrical rollers 22', the cylinder axes of which are also supported in the lateral arms 34 (see FIG. 10) via bearings 35. The arms 34 of this lower bearing bow 28 are used not only for accommodating the cylindrical rollers 22' but also form a suction trough 36 (see FIG. 10) which is under slight negative pressure. The lower bearing bow 28 is connected to a suction duct 37 (see FIG. 9) which has a flange 38 which can be connected to a suction line, not shown, in order to suck air out of the lower bearing bow 28 for generating the negative pressure. A gap 39 (see FIG. 9) located between the arms 34 and the hollow cylinder 8 is dimensioned to be narrow enough for the negative pressure occurring in the suction trough 36 to be sufficient for holding the hollow cylinder 8 against the cylindrical rollers 22' of the lower hollow frame 28. The bow 28 surrounds the hollow cylinder 8 by somewhat less than 180 degrees in its lower part.

The cylindrical rollers 22' can be arranged in the bearing bows 28 and 29 in such a manner that the cylinder axes of the cylindrical rollers 22' lie parallel to the cylinder axis 14 of the hollow cylinder 8. However, it is also possible to tilt the cylinder axes 40 of the cylindrical rollers 22' in such a manner that they are inclined with respect to a plane in which the cylinder axis 14 extends. This can be seen particularly well on the center cylindrical roller 22' in FIG. 10. The circumferential speed of the cylindrical rollers 22' (as schematically represented at 41) thus has an additional component 42 which lies in the direction of the cylinder axis 14 of the hollow cylinder 8.

The cylindrical rollers 22' may have a slightly concave contour on their surface. This concave surface contour of the cylindrical rollers 22', together with the inclined position of these cylindrical rollers 22', has the effect that the hollow cylinder 8 can roll on the cylindrical rollers 22' with an even more accurate hollow-cylinder surface contour and without damaging its outside lacquer skin applied to it.

According to the invention, as with the embodiment of FIG. 3, the laser beam 4 impinges on the hollow cylinder 8 in an area 43 which is directly damped by the cylindrical rollers 22'. The laser beam 4 thus always extends in the central area of the support bearing 21, namely preferably in the center of the support bearing 21 seen in the axial direction. It then passes through the area between two adjacent cylindrical rollers 22', one belonging to the upper bearing bow 29 and the other belonging to the lower bearing bow 28.

Figure 11:
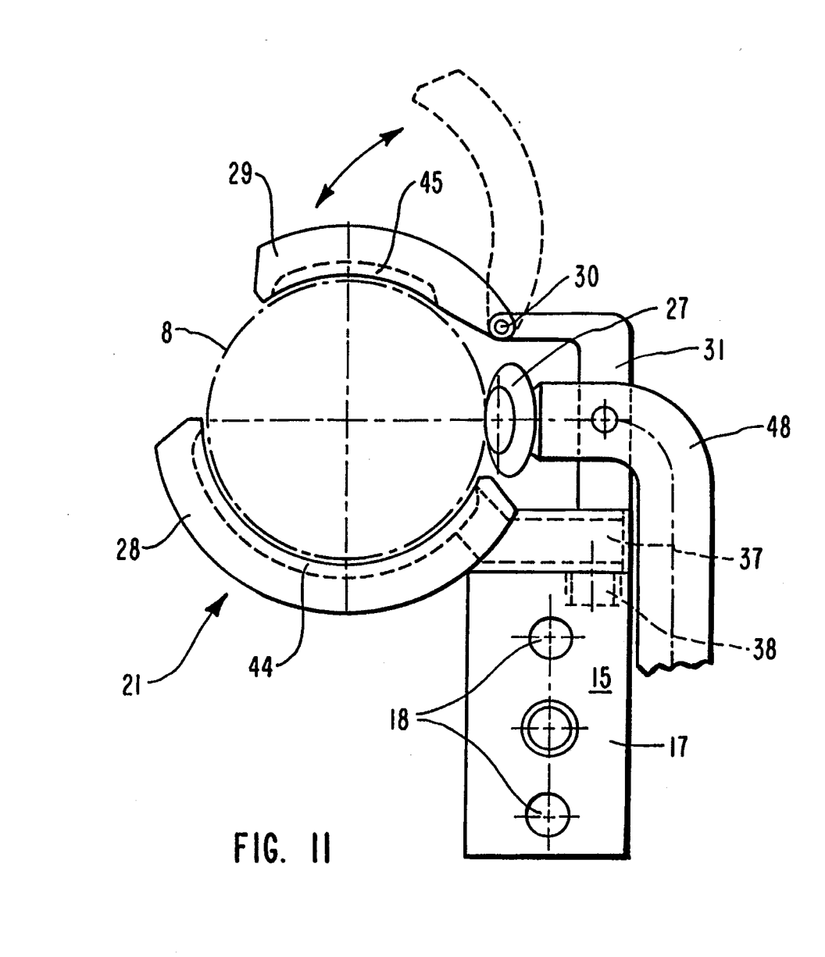
FIG. 11 shows a front view of a support bearing according to a fifth illustrative embodiment.
Figure 12:
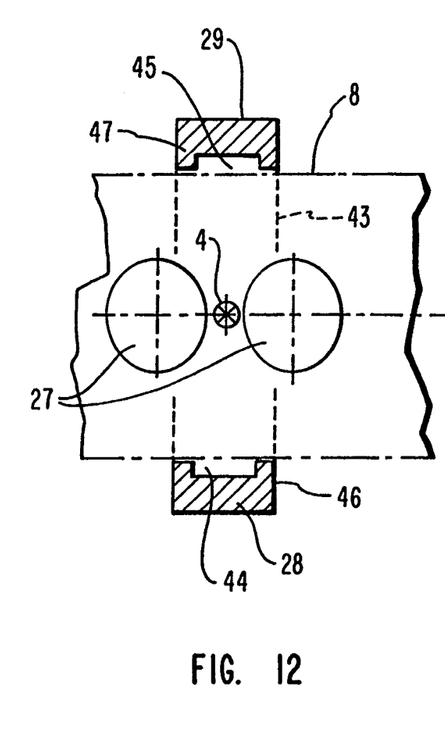
FIG. 12 shows a side view of the support bearing according to FIG. 11.

A fifth illustrative embodiment of the invention is shown in FIGS. 11 and 12. The same or identical parts as in FIGS. 9 and 10 are provided with the same reference numerals.

The support bearing 21 according to the fifth illustrative embodiment differs from that according to the fourth illustrative embodiment in that no bodies of rotation are arranged in the bearing bows 28 and 29. Instead, the bearing bows 28 and 29 only have the ducts 44 and 45 (see FIG. 12), extending in their longitudinal direction or, respectively, in circumferential direction of the hollow cylinder 8, which can be used as suction ducts. According to FIGS. 11 and 12, only the lower duct 44 is connected via a suction duct and a flange 38 to a suction line, not shown, via which a negative pressure can be generated in the duct 44. The side walls or arms of the duct 44 and also those of the duct 45, are brought close to the surface of the hollow cylinder 8 in order to form a narrow gap between their end faces and the hollow cylinder 8. As a result, a sufficiently strong negative pressure can be achieved in the duct 44, even with only low suction power of a pump connected to the suction line. The gap can have a size of a few tenths of a millimeter.

The lower bearing bow 28, which almost surrounds the hollow cylinder 8 in a semicircle, is also permanently mounted on the carriage 15 in this case, similarly to the upper bearing bow 29 via the arm 31. The upper bearing bow 29 can be pivoted about the hinge 30 in order to be able to insert the hollow cylinder 8 in the support bearing 21 or to remove it from the latter. A holding device 48 is used for, among other things, positioning the supporting discs 27.

As is shown in particular in FIG. 12, the laser beam 4 after having passed through the opening between the support discs 27 also impinges radially on the surface of the hollow cylinder 8 in this case in an area 43 which is defined by the axial width of the support bearing 21 or of the bearing bows 28, 29 respectively. The opening is located between the in each case right-hand ends of lower and upper bearing bow 28 and 29, respectively, in FIG. 11.

The present invention may be embodied in other specific forms without departing from its spirit or essential characteristics. For example, the illustrative embodiments each show the laser beam first extending parallel to the hollow cylinder before the former is deflected by 90 degrees in order to impinge radially on the hollow cylinder. However, the laser beam can also be directed or brought so as to impinge the hollow cylinder in other ways, for example via optical waveguides. Thus, it is not important that the laser beam is parallel to the hollow cylinder before being directed onto the surface of the cylinder. It is only important that the section of the laser beam extending in the radial direction of the hollow cylinder can be moved in the longitudinal or axial direction of the hollow cylinder. Accordingly, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A device for machining the surface of a thin-walled hollow cylinder using a laser beam, comprising:
    bed means for rotatably holding the hollow cylinder;
    focusing means for directing the laser beam onto the surface of the hollow cylinder so as to produce a machined surface thereon;
    carriage means, carrying the focusing means and slidably mounted to the bed means, for providing movement of the focusing means along the length of the hollow cylinder as it is rotated thereby directing the laser beam onto the surface of the hollow cylinder as the cylinder is rotated and as the focusing means moves along the cylinder's length; and
    bearing means, held by the carriage means, for providing moveable support around the hollow cylinder's circumference by moving the bearing means with the focusing means and carriage means, and wherein the bearing means is held stationary around the cylinder's circumference and comprises an opening which extends in a radial direction and is positioned with respect to the laser beam such that the laser beam runs through the opening to the surface of the hollow cylinder.

2. A device as defined in claim 1, wherein the bearing means at least partially surrounds the hollow cylinder in an annular fashion.

3. A device as defined in claim 2, wherein the bearing means comprises bearing bows which can be pivoted with respect to one another.

4. A device as defined in claims 1, 2 or 3, wherein the bearing means comprises a hollow frame having a side open towards the hollow cylinder, and wherein the hollow frame is connected to a source of suction.

5. A device as defined in claim 4, wherein the hollow frame comprises arms positioned close to the surface of the hollow cylinder to form a small gap between the end faces of the arms and the hollow cylinder.

6. A device as defined in claim 5 wherein the bearing means comprises bodies of rotation supported by the arms.

7. A device as defined in claim 1, wherein the bearing means comprises a plurality of bodies of rotation on which the surface of the hollow cylinder rolls, and wherein the laser beam is directed onto the surface of the hollow cylinder in an area between at least two bodies of rotation.

8. A device as defined in claim 7, wherein the bodies of rotation are aligned in such a manner that they transfer a force component both in a tangential direction and a force component in an axial direction relative to the hollow cylinder.

9. A device as defined in claim 6, wherein the bodies of rotation are aligned in such a manner that they transfer a force component both in a tangential direction and a force component in an axial direction relative to the hollow cylinder.

10. A device as defined in claim 6, wherein the bodies of rotation comprise conical rollers.

11. A device as defined in claim 7, wherein the bodies of rotation comprise conical rollers.

12. A device as defined in claim 8, wherein the bodies of rotation comprise conical rollers.

13. A device as defined in claim 9, wherein the bodies of rotation comprise conical rollers.

14. A device as defined in claim 6, wherein the bodies of rotation comprise cylindrical rollers.

15. A device as defined in claim 7, wherein the bodies of rotation comprise cylindrical rollers.

16. A device as defined in claim 8, wherein the bodies of rotation comprise cylindrical rollers.

17. A device as defined in claim 9, wherein the bodies of rotation comprise cylindrical rollers.

18. A device as defined in claim 10, wherein the bodies of rotation comprise a concave contour surface contacting the hollow cylinder.

19. A device as defined in claim 11, wherein the bodies of rotation comprise a concave contour surface contacting the hollow cylinder.

20. A device as defined in claim 12, wherein the bodies of rotation comprise a concave contour surface contacting the hollow cylinder.

21. A device as defined in claim 13, wherein the bodies of rotation comprise a concave contour surface contacting the hollow cylinder.

22. A device as defined in claim 14, wherein the bodies of rotation comprise a concave contour surface contacting the hollow cylinder.

23. A device as defined in claim 15, wherein the bodies of rotation comprise a concave contour surface contacting the hollow cylinder.

24. A device as defined in claim 16, wherein the bodies of rotation comprise a concave contour surface contacting the hollow cylinder.

25. A device as defined in claim 17, wherein the bodies of rotation comprise a concave contour surface contacting the hollow cylinder.

26. A device for machining the surface of a thin-walled hollow cylinder using a laser beam, comprising:
bed means for rotatably holding the hollow cylinder;
focusing means for directing the laser beam onto the surface of the hollow cylinder so as to produce a machined surface thereon;
carriage means, carrying the focusing means and slidably mounted to the bed means, for providing movement of the focusing means along the length of the hollow cylinder as it rotated thereby directing the laser beam onto the surface of the hollow cylinder as the cylinder is rotated and as the focusing means moves along the cylinder's length; and
bearing means held by the carriage means, for providing moveable support around the hollow cylinder's circumference by moving the bearing means with the focusing means and carriage means, and wherein the bearing means is held stationary around the cylinder's circumference and comprises an opening for radial passage of the laser beam through the opening to the surface of the hollow cylinder, and wherein the bearing means comprises a hollow frame having a side open towards the hollow cylinder, and wherein the hollow frame is connected to a source of suction and comprises (a) arms positioned close to the surface of the hollow cylinder to form a small gap between the end faces of the arms and the hollow cylinder and (b) bodies of rotation supported by the arms.

* * * * *